United States Patent
Faryar et al.

(10) Patent No.: US 6,363,113 B1
(45) Date of Patent: Mar. 26, 2002

(54) METHODS AND APPARATUS FOR CONTEXT-BASED PERCEPTUAL QUANTIZATION

(75) Inventors: Alireza Farid Faryar, Fair Haven; Moushumi Sen, West End; Kyeong Ho Yang, Freehold; Wenwu Zhu, Parsippany, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/326,874

(22) Filed: Jun. 7, 1999

(51) Int. Cl.[7] ................................................. H04N 7/24
(52) U.S. Cl. .......................... 375/240.03; 375/240.24; 382/251
(58) Field of Search ........................... 348/404.1, 405.1, 348/420.1; 375/240.01–240.07, 240.11–240.16, 240.24, 240.27; 382/232, 236, 238, 251; H04N 7/12, 7/24

(56) References Cited

U.S. PATENT DOCUMENTS

| | | | | |
|---|---|---|---|---|
| 5,214,507 A | * | 5/1993 | Aravind et al. | 375/240.15 |
| 5,481,308 A | * | 1/1996 | Hartung et al. | 375/240.11 |
| 5,677,734 A | * | 10/1997 | Oikawa et al. | 375/240.24 |
| 6,243,497 B1 | * | 6/2001 | Chiang et al. | 348/405.1 |
| 6,285,715 B1 | * | 9/2001 | Ozcelik et al. | 375/240.27 |
| 6,289,052 B1 | * | 9/2001 | Faryar et al. | 375/240.16 |

* cited by examiner

Primary Examiner—Richard Lee
(74) Attorney, Agent, or Firm—Ryan, Mason & Lewis, LLP

(57) ABSTRACT

A method of perceptually quantizing a block of an image or video sequence includes generating a non-perceptibility of distortion value. The non-perceptibility of distortion value is calculated from one or more masking values, e.g., complexity, brightness, movement, etc., which themselves are respectively calculated from previously reconstructed samples associated with the image or video sequence. The reconstructed samples form one or more causal templates that are used to calculate such masking effects and, thus, the non-perceptibility of distortion value. The perceptual quantization method then includes generating a quantization step size value which is a function of the non-perceptibility of distortion value. Since templates consisting only of previously reconstructed samples are used to derive the quantization step size value, the templates used at the encoder are also available at the decoder. As a result, an encoder does not need to provide quantization-related information to the corresponding decoder since the decoder can get the information using the same causal templates as those used at the encoder.

27 Claims, 4 Drawing Sheets

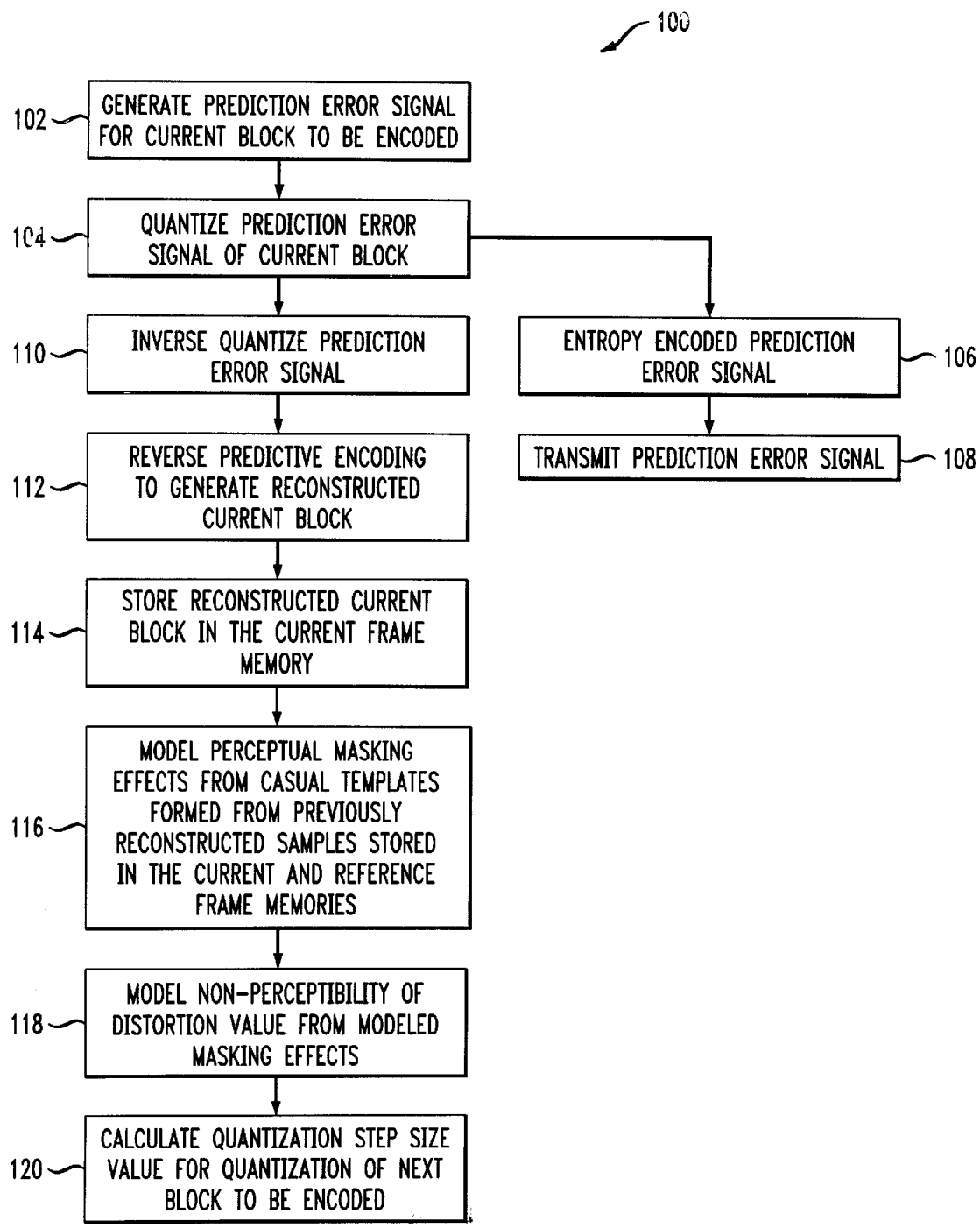

METHODS AND APPARATUS FOR CONTEXT-BASED PERCEPTUAL QUANTIZATION

CROSS REFERENCE TO RELATED APPLICATIONS

The present application is related to U.S. Pat. No. 6,289,052 issued on Sep. 11, 2001 and entitled: "Methods And Apparatus For Motion Estimation Using Causal Templates," and to U.S. Pat. application identified as Ser. No. 09/326,872 and entitled "Methods And Apparatus For Context-based Inter/Intra Mode Selection," both filed concurrently with the present application on Jun. 7, 1999.

The U.S. Government has a paid-up license in this invention and the right in limited circumstances to require the patent owner to license others on reasonable terms as provided for by the terms of NIST cooperative agreement no. 70NANB7H3051 (proposal no. 97-04-0020) entitled: "Enabling Technology for a Digital Video Optical Tape Recorder of High Definition Motion Imagery."

FIELD OF THE INVENTION

The invention relates to video and/or image compression and, more particularly, to context-based perceptual quantization methods and apparatus in a video and/or image compression system.

BACKGROUND OF THE INVENTION

There have recently been many efforts to develop compression schemes for images and video to provide a very good quality of compressed images/video. The schemes can be classified into three categories: (i) a block-based transform coding approach; (ii) a predictive coding approach based on spatial prediction; and (iii) a wavelet transform coding approach. The block-based transform coding approach has been described in technical literature such as, for example, in: *Draft of MPEG-2: Test Model* 5, ISO/IEC JTC1/SC29/WG11, April 1993; *Draft of ITU-T Recommendation* H.263, ITU-T SG XV, December 1995; and A. N. Netravali and B. G. Haskell, *Digital Pictures: Representation, Compression, and Standards*, 2$^{nd}$ Ed., Plenum Press, 1995, the disclosures of which are incorporated herein by reference. Further, the predictive coding approach based on spatial prediction has been described in technical literature such as, for example, in: *Lossless and Near-lossless Coding of Continuous Tone Still Images* (JPEG-LS), ISO/IEC JTC1/SC 29/WG Jul. 1, 1997; M. J. Weinberger, J. J. Rissanen, and R. B. Arps, "Applications of Universal Context Modeling to Lossless Compression of Gray-scale Images," *IEEE Trans. Image Processing*, vol. 5, no. 4, pp.575–586, April 1996; and X. Wu and N. Memon, "Context-based, Adaptive, Lossless Image Coding," *IEEE Trans. Communications*, vol. 45, no. 4, pp. 437–444, April 1997, the disclosures of which are incorporated herein by reference. Lastly, the wavelet transform coding approach has been described in the technical literature such as, for example, in: A. Said and W. A. Pearlman, "A New, Fast, and Efficient Image Codec Based On Set Partitioning in Hierarchical Trees," *IEEE Trans. Circuit and Systems for Video Technology*, vol. 6, no. 3, pp.243–249, June 1996; and N. D. Memon and K. Sayood, "Lossless Compression of Video Sequences," *IEEE Trans. Communications*, vol. 44, no. 10, pp.1340–1345, October 1996, the disclosures of which are incorporated herein by reference.

In certain applications, the transmission bandwidth or the storage capacity is often limited so that distortion free transmission can not be achieved. Further, it is well known that the quantization step size selected by an encoder has a substantial effect on the resultant bit rate output by the encoder. Specifically, a large quantization step size performs coarse quantization, reducing the bit rate and the resulting video/image quality. On the other hand, a small quantization step size performs finer quantization, which leads to a higher bit rate and higher resulting video/image quality. Thus, in conventional encoders there is an attempt to find a quantization step size that is high enough to restrain the bit rate, while still achieving the best possible resulting video/image quality. In general, there is an attempt to maintain consistent video quality throughout a video sequence, rather than having the video quality vary widely from frame to frame. In many applications of image and video compression, the human observer is the final judge of the quality of the compressed images. In such situations, it is important to design compression algorithms that attempt to improve the subjective quality of the compressed images/video by exploiting the perceptual insensitivity characteristics of the human visual system or HVS. This can be accomplished by coarser quantization of samples in the area where the incurred distortion is less perceptible to the HVS. This approach, called "perceptual quantization," has been adopted in many compression schemes. For example, perceptual quantization has been described in the technical literature such as, for example, in: A. Puri and R. Aravind, "Motion-compensated Video Coding With Adaptive Perceptual Quantization," *IEEE Trans. Circuit and Systems for Video Technology*, vol. 1, no. 4, December 1991; N. Jayant, J. Johnston, and R. Safranek, "Signal Compression Based On Models of Human Perception," *Proc. of IEEE*, vol. 10, October 1993; R. J. Safranek, "A Comparison of the Coding Efficiency of Perceptual Models," *Proc.* SPIE, vol. 2411, pp.83–91, 1995; A. M. Eskicioglu and P. S. Fisher, "Image Quality Measures and Their Performance," *IEEE Trans. Communications*, vol. 43, no. 12, pp.2959–2965, December 1995; and H. H. Y. Tong and A. N. Venetsanopoulos, "A Perceptual Model For JPEG Applications Based On Block Classification, Texture Masking, and Luminance Masking," *Proc. IEEE International Conference in Image Processing*, Chicago, Ill., October 1998, the disclosures of which are incorporated herein by reference.

However, these prior art schemes require sending overhead information pertaining to quantization step size to the decoder since the samples used for selecting the step size are not available at the decoder. The overhead burden of sending overhead information pertaining to quantization step size to the decoder can be extremely heavy, particularly when quantizer selection is performed on the basis of a small block. Thus, it would be highly advantageous to have a perceptual quantization scheme which does not require quantization-related overhead information to be transmitted to a decoder.

SUMMARY OF THE INVENTION

The present invention provides for context-based perceptual quantization of an image or video sequence wherein a quantization step size value is generated for a current block of an image or video sequence based only on previously reconstructed samples associated with the image or video sequence. Advantageously, an encoder employing the methodologies of the invention is not required to transmit quantization-related overhead information to a decoder.

In one aspect of the invention, a method of perceptually quantizing a block of at least one image includes generating a non-perceptibility of distortion value. The non-perceptibility of distortion value is calculated from one or more masking values, e.g., complexity, brightness, movement, etc., which themselves are respectively calculated from previously reconstructed samples associated with the at least one image. The reconstructed samples may form one or more sets that are used to calculate such masking effects and, thus, the non-perceptibility of distortion value. In one embodiment, a set of samples is in the form of a template. A template having only previously reconstructed samples is referred to as a causal template. The perceptual quantization method then generates a quantization step size value as a function of the non-perceptibility of distortion value for use in quantizing the block of the at least one image. In this manner, coarser quantization is performed on the image or video sequence when the one or more masking values indicate that incurred distortion is less likely to be perceived by an observer.

Since generation of the quantization step size value at an encoder is accomplished according to the invention using sets or templates consisting only of previously reconstructed samples, it is to be appreciated that such sets or templates are also available at the decoder, i.e., by performing a similar quantization step size generation process at the decoder. As a result, an encoder of the invention does not need to provide quantization-related information to the corresponding decoder since the decoder can get the information using the same causal sets or templates used at the encoder. Advantageously, transmission bandwidth and/or storage capacity is saved.

BRIEF DESCRIPTION OF THE DRAWINGS

FIG. 5 is a flow diagram illustrating context-based perceptual encoding according to an exemplary embodiment of the present invention.

DETAILED DESCRIPTION OF PREFERRED EMBODIMENTS

As used herein, the term "video" or "video sequence" should be understood to include any frame or field sequence which is in a form suitable for encoding in accordance with standards such as, for example, H.261, H.263, Motion-JPEG, MPEG-1 and MPEG-2. The terms "image" or "picture" as used herein refer to a frame or field of a video sequence. The term "block" as used in accordance with the invention is intended to include not only macroblocks as defined in the above-noted compression standards, but more generally, any grouping of pixel elements in a video frame or field. It is to be appreciated that such a grouping may include a set of pixels or a single pixel. Further, the meaning of the term "sample" as used in accordance with the invention refers to a pixel or some subset of information, e.g., component, associated with a pixel. Still further, the term "context" refers to a value used to describe a current block's surroundings which, according to the invention, is derived from previously reconstructed samples. As mentioned above and as will be explained in detail, in context-based perceptual quantization according to the invention, the context is a value for the non-perceptibility of distortion value which may be measured from previously reconstructed spatially and/or temporally neighboring samples. It is to be appreciated that such perceptual quantization technique is performed in both a video encoder and video decoder so that quantization-related data does not need to be transmitted from the encoder to the decoder.

It is known that in prior art encoders that employ perceptual quantization, the quantization step size used to control the resolution of quantization is a function of a non-perceptibility of distortion value associated with a current block. The non-perceptibility of distortion value or, simply, non-perceptibility value, is related to insensitivities associated with the HVS. It is well known that the HVS is unable to distinguish distortion associated with elements, e.g., pixels, blocks, of an image or video in the same spectral, temporal, or spatial locality. For example, a human observer can not easily detect certain degrees of distortion in spatially busy areas of an image/video, very bright areas of an image/video, or moving areas of video. This is central to the concept of distortion masking whereby distortion inevitably introduced in the coding process, if properly shaped or distributed, is masked by the input signal itself such that it is substantially non-perceivable by a human observer. Accordingly, the non-perceptibility value is a computed quantity or number that represents a measure of such masking and distortion effects. Perceptual quantization exploits the idea that coarser quantization and, thus, a reduced bit rate may be applied in areas of an image/video where masking effects dictate that a human observer would likely not be able to perceive the distortion attributed to a reduced bit rate.

Figure 1A:
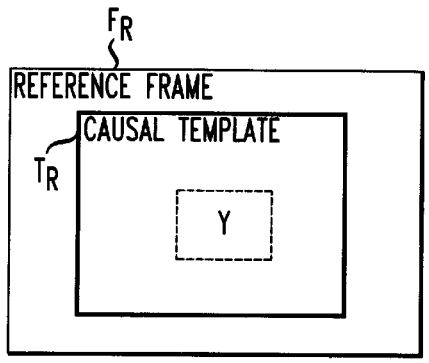
FIGS. 1A and 1B are respective diagrams of conventional templates used to calculate non-perceptibility in a conventional manner.
Figure 1B:
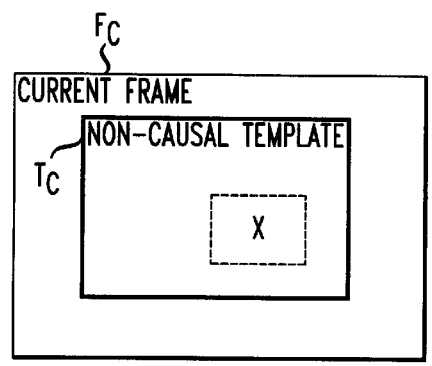

It is also known, however, that this non-perceptibility value is typically measured by using a sample set or template consisting of the current block and its neighboring samples. Since the current frame is available to the encoder, such template includes samples of the current frame that have not yet been encoded and reconstructed. It is to be appreciated that a template is referred to as non-causal if it includes samples for which respective reconstructed samples have not yet been generated. Referring now to FIGS. 1A and 1B, examples of conventional templates used to calculate the non-perceptibility value are shown. In FIG. 1B, a current frame $F_C$ is shown having a block 'X' as the current block to be encoded. In conventional perceptual encoding, the template $T_c$ from the current frame $F_C$ used to determine the non-perceptibility of distortion value includes the current block 'X,' as well as other neighboring samples. By neighboring samples, this includes samples in blocks that both precede and follow 'X' in a sequential block-by-block encoding process. It is assumed that such encoding of a frame begins with the block at the upper left hand corner of the frame and ends with the block at the lower right hand corner of the frame. Template $T_C$ is referred to as a non-causal template since it includes samples for which respective reconstructed samples have not yet been generated, e.g., the current block and samples in the next blocks. It is to be understood that an example of encoding and generating reconstructed samples will be explained in the context of FIG. 2 of the present invention.

Nonetheless, the conventional perceptual encoding process also utilizes a reference frame to calculate the non-perceptibility of distortion value. Such a reference frame is shown in FIG. 1A as reference frame $F_R$. Reference frame $F_R$ includes a template $T_R$ which includes the block 'Y.' Block 'Y' is the block in the reference frame that corresponds to the current block 'X' in the current frame. Since, as is known by definition, a reference frame is a frame which has preceded the current frame in the encoding process, all the samples in the reference frame have already been encoded and therefore the template only includes samples that have been previously reconstructed. It is to be appreciated that a template is referred to as causal if it includes only samples for which respective reconstructed samples have been generated. Therefore, while template $T_C$ is a non-causal template, template $T_R$ is a causal template. These two templates are used to calculate non-perceptibility in the conventional perceptual quantization approach, in a manner known in the art. From the non-perceptibility value, the quantization step size is calculated and applied to the quantizer of the encoder.

Now, turning to a corresponding conventional decoder, since such decoder reverses the quantization process, referred to as inverse quantization, while decoding a received bitstream, it must know the quantization step size applied by the encoder, or be able to derive it. Given the fact that samples that have not yet been encoded and reconstructed and transmitted by the encoder are used to derive the quantization step size, e.g., template $T_C$ in FIG. 1B, it is necessary for the encoder to send information about the quantization step size used in the encoder. In other words, this is necessary since all the samples in the template are not available at the decoder, especially samples in the current block. As mentioned, this may yield unacceptable overhead in an attached transmission or storage medium having a limited bandwidth or capacity.

In a significant departure from such prior art perceptual encoders, a perceptual encoder of the present invention adaptively changes the quantization step size value, $Q_{step}$, as a function of a non-perceptibility of distortion value, $M_p$, derived using only previously reconstructed samples. That is, a perceptual encoder of the present invention employs only causal templates in calculating the non-perceptibility value, $M_p$, and, unlike prior art perceptual encoders, such inventive perceptual encoder does not need to transmit any quantization-related overhead information to a decoder.

Particularly, as will be explained, the quantization step size value, $Q_{step}$, is determined as a function of $M_p$:

$$Q_{step}=f(M_p), \quad (1)$$

where f() is a non-decreasing function with respect to $M_p$ such that a larger quantization step size is used in the quantization process if $M_p$ is larger, i.e., incurred distortion is less perceptible by the HVS. By way of example and as will be explained below, $f(M_p)$ may equal int $[\alpha \cdot M_p]$, where int [] refers to integer rounding and $\alpha$ is a positive constant. It is to be understood that f() is dependent on the particular definition of $M_p$ used in the methodology of the invention. Thus, the value of $M_p$ increases if related perceptual masking effects or values dictate that distortion associated with the portion of the video and/or image is less perceivable to the HVS. Consequently, the value of $Q_{step}$ is increased and the bit rate of the encoder is reduced without causing a perceivable reduction in video/image quality to the human observer. Advantageously, this is accomplished without the need to provide quantization-related overhead information to a corresponding decoder. To make this adaptation possible without any overhead information, the present invention measures the value of $M_p$ by using previously reconstructed samples. Since such previously reconstructed samples are also available at the decoder and, thus, the quantization step size used to quantize a block can be derived therefrom, quantization-related overhead information is not required to be transmitted and/or stored for use in the decoding process. As a result, transmission bandwidth and/or storage capacity is saved.

Figure 2:
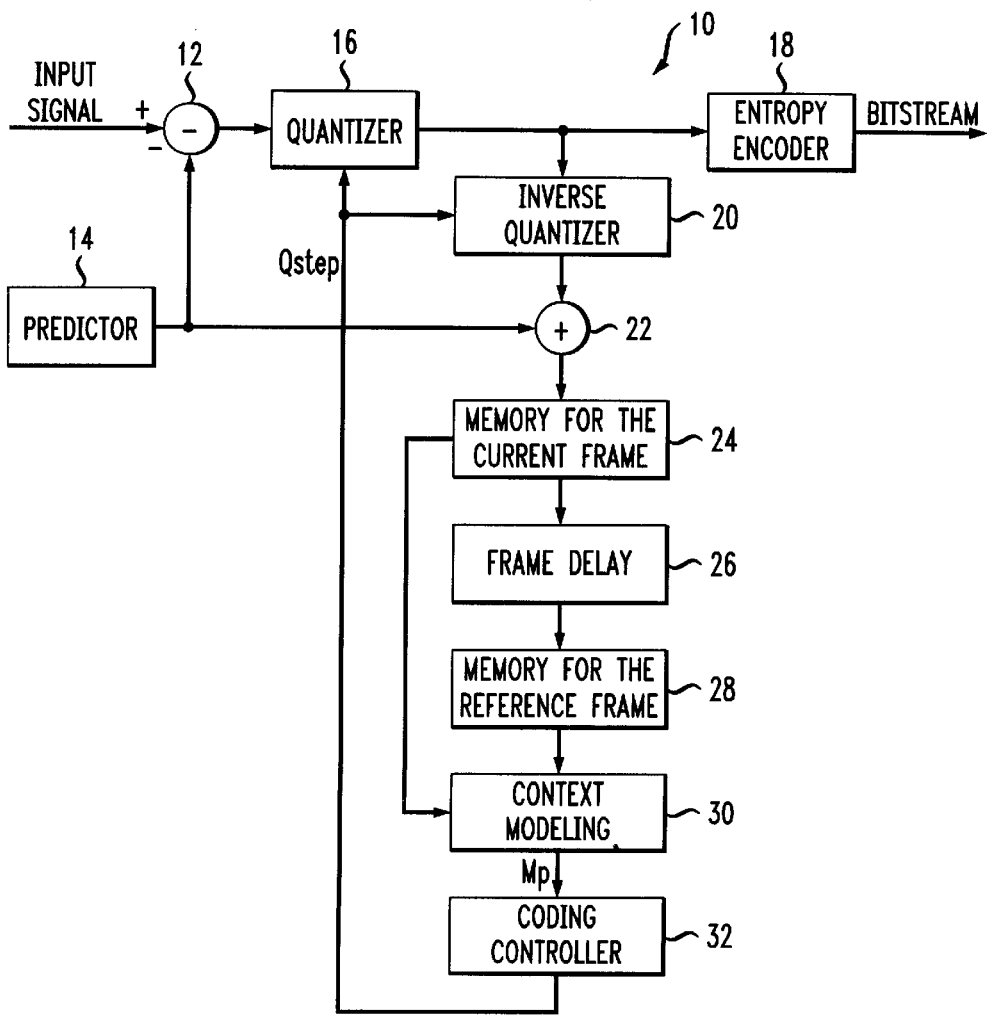
FIG. 2 is a block diagram of a context-based perceptual encoder according to an exemplary embodiment of the present invention.

FIG. 2 depicts a block diagram of an image/video encoder implementing context-based perceptual quantization according to an exemplary embodiment of the invention. The encoder 10 includes a signal subtractor 12 having a first input terminal coupled to the input terminal of the encoder 10. The encoder 10 also includes a predictor 14 having an output terminal coupled to a second input terminal of the signal subtractor 12. The encoder 10 also includes a quantizer 16 having an input terminal coupled to an output terminal of the signal subtractor 12, and an entropy encoder 18 having an input terminal coupled to an output terminal of the quantizer 16. The entropy encoder 18 has its output terminal coupled to the output terminal of the encoder 10. The encoder 10 also includes an inverse quantizer 20 having an input terminal coupled to the output terminal of the quantizer 16, and a signal adder 22 having a first input terminal coupled to an output terminal of the inverse quantizer 20 and a second input terminal coupled to the output terminal of the predictor 14. Further, the encoder includes a current frame memory 24 having an input terminal coupled to an output terminal of the signal adder 22 and a reference frame memory 28 having an input terminal coupled to an output terminal of the current frame memory 24. It is to be appreciated that a frame delay block 26 is shown interposed between the current memory 24 and the reference memory 28. It should be understood that this block merely indicates that there is a one frame period delay between samples in the current frame memory and samples in the reference frame memory. A context modeling unit 30 is also included in the encoder 10 with input terminals coupled to output terminals of the current frame memory 24 and the reference frame memory 28. The encoder 10 also includes a coding controller 32 having an input terminal coupled to an output terminal of the context modeling unit 30 and an output terminal coupled to a second input terminal of the quantizer 16 and to a second input terminal of the inverse quantizer 20. It is to be appreciated that if predictive coding is not implemented, then predictor 14, subtractor 12 and adder 22 would not be necessary.

Figure 3A:
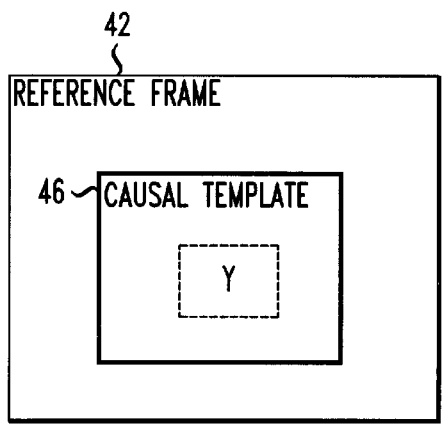
FIGS. 3A and 3B are respective diagrams of causal templates for a reference frame and a current frame used to calculate non-perceptibility according to the present invention.
Figure 3B:
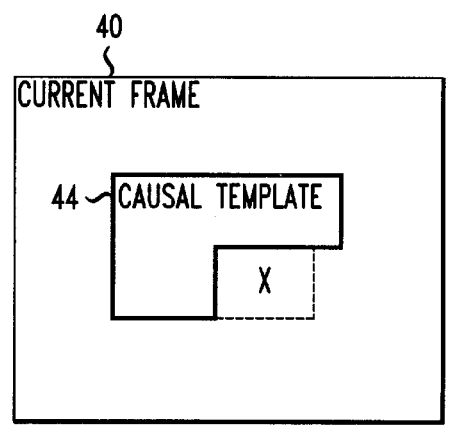

Given the above interconnectivity of components in the exemplary perceptual encoder 10, a description of a corresponding encoding operation will now follow. It is to be appreciated that the encoder 10 may be employed to encode a video sequence and/or an image on a block by block basis. A block may be a pixel, a set of pixels or some other portion of a frame. Nonetheless, as will be explained in detail, the present invention employs causal templates to calculate the non-perceptibility of distortion value, $M_p$, which include previously reconstructed samples, i.e., pixel or some subset of information associated therewith, from a current frame and a reference frame. The concept is generally illustrated, by way of example, in FIGS. 3A and 3B. FIGS. 3A and 3B respectively show causal templates used to calculate the non-perceptibility of distortion value formed from a current frame 40 (FIG. 3B) and a reference frame 42 (FIG. 3A). 'X', in FIG. 3B, refers to the current block to be encoded and 'Y', in FIG. 3A, refers to the corresponding block in the reference frame. As shown, a causal template 44 is formed from samples in the current frame 40. However, unlike prior art templates used to calculate the non-perceptibility value, template 44 does not include the current block 'X' or any samples in blocks that follow 'X' in the encoding process. It is assumed that samples of the current frame are processed, e.g., encoded and reconstructed, from the upper left hand corner of the frame to the lower right hand corner of the frame. Thus, template 44 only includes samples from the current frame which have already been encoded and reconstructed. Similarly, a template 46 is formed from samples in the reference frame 42 which, by definition, only includes previously reconstructed samples. It is to be understood that reconstructed samples in block 'X' may then be part of the causal template used in the next encoding iteration for the next block. As will be explained in detail in the context of FIGS. 2, 4A and 4B, causal templates that are constructed from previously reconstructed samples, e.g., causal templates 44 and 46, are employed to calculate the non-perceptibility of distortion value, $M_p$, which is then used to calculate the quantization step size, $Q_{step}$. Since such previously reconstructed samples are available at a corresponding decoder at the time the current block is to be decoded, i.e., since they have already been decoded and stored in decoder memory, no quantization-related overhead information needs to be transmitted and/or stored with the encoded bitstream.

Referring back to FIG. 2, the encoder 10 receives an input signal. The input signal may be an image, a video sequence, or the like. It is to be appreciated that when spatial and/or temporal prediction is performed, i.e., when predictor 14 is included in the encoder 10, a prediction error associated with the current block is quantized by quantizer 16, entropy encoded by entropy encoder 18 and then transmitted and/or stored. The prediction error signal is formed by subtracting a predictor signal generated by spatial and/or temporal predictor 14, as is known in the art, from the input signal received by the encoder 10. Specifically, the signal subtractor 12 receives the input signal and the predictor signal and performs a signal subtraction to yield the prediction error signal for the current block. By reversing the prediction process at the decoder using the prediction error signal, a decoded representation of the original signal input to the encoder 10 is achieved. If predictive coding is not implemented, input values originally received at the input terminal of the encoder 10 are quantized, entropy-encoded and then transmitted and/or stored.

After the current block is quantized, besides being sent to the entropy encoder 18 for eventual output, it is provided to the inverse quantizer where the effects of the quantization process are reversed using the same quantization step size $Q_{step}$ used by quantizer 16. Next, if predictive encoding is implemented, the predictor signal is added to the prediction error in signal adder 22 such that a reconstructed representation of the current block is generated. If predictive coding is not implemented, then the inverse quantized block is considered the reconstructed block. The reconstructed block is stored in the current frame memory 24, along with each reconstructed block from the current frame. After the entire current frame is reconstructed, i.e., when the last block in the current frame is reconstructed, the reconstructed frame is transferred to the reference frame memory 28. As a result, when the first block of the next frame is processed, a reference frame delayed by one frame period exists in the reference frame memory. It should be understood that no reference frame exists for the first frame processed, in which case, the quantization step size is calculated from only a causal template from the current frame when movement masking is not considered.

Next, the context modeling unit 30 forms causal templates, for example as shown in FIGS. 3A and 3B and, as will be explained, FIGS. 4A and 4B, from previously reconstructed samples taken from the current frame memory 24 and the reference frame memory 28. It should be understood that at the start of each new frame, some iterations of the encoding process are preferably performed before a preferred amount of reconstructed samples are stored in the current frame memory for forming causal templates. In such case, some predetermined initial value is used for the quantization step size for these initial iterations. In any case, the context modeling unit 30 calculates $M_p$ from the causal templates. $M_p$ is then used by the coding controller 32 to calculate the quantization step size $Q_{step}$. As mentioned, $Q_{step}$ is then applied to the quantizer 16 to quantize the next block to be encoded. Accordingly, this process is repeated such that the quantization step size is adaptively changed as a function of the non-perceptibility of distortion value $M_p$.

There are many kinds of perceptual masking effects that can be used to calculate $M_p$ in compressed images/video: texture masking, $M_t$, brightness masking, $M_b$, movement masking, $M_m$, color masking, $M_c$, spectral masking, $M_s$, and so on:

$$M_p = g(M_t, M_b, M_m, M_c, M_s, \ldots), \qquad (2)$$

where g() represents the function by which the various perceptual masking effects influence $M_p$. By way of example, the finction g() can perform a weighted summation of the various masking effects. As mentioned and as is known, masking effects refer to the situation where distortion is masked by the input signal itself such that the distortion is substantially non-perceivable by a human observer, i.e., HVS. This can occur in areas where the image or video: has particularly complex texture, i.e., texture masking; is particularly intense, i.e., brightness masking; has significant motion associated therewith in the case of video, i.e., movement masking, to name a few examples.

Such perceptual masking effects are discussed in the above-referenced articles pertaining to perceptual quantization. However, while perceptual quantization has been applied to many compression schemes as, for example, discussed in these articles, it has mostly been applied to the transform coding schemes. One reason that perceptual quantization has not been applied to predictive coding in the spatial domain by prior art approaches is because it requires too many overhead bits resulting from a pixel-based processing. Advantageously, the perceptual encoding methodologies of the invention provide a solution to this drawback and thus are particularly applicable to predictive coding in the spatial domain. However, while the following embodiment involves such an application, it is to be understood that the invention is not so limited, that is, it may be applied to other encoding approaches.

In this embodiment, a perceptual quantization scheme for pixel-based predictive coding of video/images in the spatial domain includes calculating $M_p$ by exploiting three perceptual masking effects: complexity masking; brightness masking; and movement masking:

$$M_p = g(M_t, M_b, M_m), \qquad (3)$$

where $M_p$ is a non-decreasing function with respect to each of $M_t$, $M_b$, and $M_m$.

Figure 4A:
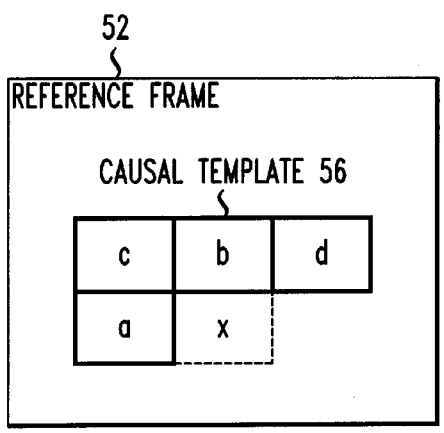
FIGS. 4A and 4B are respective diagrams of causal templates for a reference frame and a current frame used to calculate non-perceptibility in a pixel-based predictive coding in the spatial domain according to the present invention.
Figure 4B:
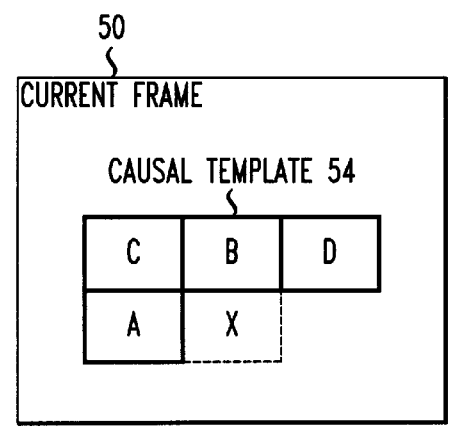

Referring now to FIGS. 4A and 4B, a causal template 54 from a current frame 50 (FIG. 4B) and a causal template 56 from a reference frame 52 (FIG. 4A) are formed to calculate $M_p$ from $M_t$, $M_b$, and $M_m$. Formation of the templates is performed by the context modeling unit 30 from previously reconstructed samples taken from the frame memories 24 and 28. Samples A, B, C and D form the current frame template 54 and samples a, b, c and d form the reference frame template 56. It should be understood that while the templates in FIGS. 4A and 4B employ the four previously reconstructed pixels adjacent to a particular pixel, templates formed in accordance with the invention are not so limited. That is, they may include a greater or lesser number of samples. Also, the samples do not necessarily have to be contiguous with respect to the current pixel to be encoded. But it is preferred to use samples (or blocks) which are contiguous to the current block since they have a higher correlation with the current sample than those that are not contiguous. The various masking values or effects are calculated by performing arithmetic operations with the samples from one or both the templates, depending on the particular masking effect. For example, in the case of complexity masking, intensity values associated with samples in the current frame template are subtracted from intensity values associated with other samples in the current frame template and then the absolute values of the respective differences are computed and summed. In the case of brightness masking, the intensity values of samples in the current frame template are averaged. Further, in the case of motion masking, samples from the current frame template are subtracted from corresponding samples from the reference frame template and the absolute values of the differences are summed. As such, $M_t$, $M_b$, and $M_m$ are respectively modeled as in equations (4), (5) and (6), below:

$$M_t = h_t(\text{complexity}), \quad (4)$$

where complexity=$|D-B|+|B-C|+|C-A|$ and $h_t$(complexity) is a non-decreasing finction;

$$M_b = h_b(\text{mean}), \quad (5)$$

where mean=$(A+B+C+D)/4$ and $h_b$(mean) is a non-decreasing function;

$$M_m = h_m(\text{motion}), \quad (6)$$

where motion=$|A-a|+|B-b|+|C-c|+|D-d|$ and $h_m$(motion) is a non-decreasing finction.

Then, $M_t$, $M_b$, and $M_m$ in equations (4)–(6) are respectively modeled as:

$$M_t = \left[\frac{\text{complexity}}{k1}\right]^{w1} \quad (7a)$$

$$M_b = \left[\frac{\text{mean}}{k2}\right]^{w2}, \text{ and} \quad (7b)$$

$$M_m = \left[\frac{\text{motion}}{k3}\right]^{w3}, \quad (7c)$$

where k1, k2, k3, w1, w2, and w3 are model parameters which, in one embodiment, are respectively be set to 32, 128, 64, 0.6, 0.6, and 0.6.

Then, $M_p$ is modeled as:

$$M_p = \text{Med}[1, M_t + M_b + M_m, B_{upper}], \quad (8)$$

where Med[*,*,*] indicates the median value of the three elements and $B_{upper}$ is a parameter to set an upper bound of $M_p$. In one embodiment, $B_{upper}$ is preferably set to four.

Once $M_p$ is obtained and provided to the coding controller 32, the controller calculates the quantization step size, $Q_{step}$ as follows:

$$Q_{step} = 2 * \text{int}[M_p * Q_o] + 1, \quad (9)$$

where $Q_o$ is the quantization parameter to be used for controlling the overall bitrate and int[ ] refers to integer rounding. It is to be appreciated that when the methodologies of the invention are applied to image coding, $M_m$ is set to zero.

Similar approaches can be used for the general templates given in FIGS. 2A and 2B based on the basic concept that the HVS can not easily detect the distortion associated with a pixel or a block in spatially busy areas, very bright areas, and moving areas.

Referring now to FIG. 5, a flow chart of an exemplary perceptual encoding method 100 according to the invention is shown. It is assumed that predictive encoding is implemented and the overall encoding process has already progressed such that a reference frame is available and causal templates according to the invention have been formed. In step 102, a prediction error signal is generated from the current block to be encoded. The prediction error signal for the current block is quantized, in step 104. Then, the prediction error for current block is entropy encoded, in step 106, and then transmitted or stored, in step 108.

Next, the current block is reconstructed. That is, the prediction error for the current block is first inverse quantized, in step 110. Then, predictive encoding is reversed, in step 112. The reconstructed current block is then stored in a current frame memory, in step 114. As previously mentioned, each reconstructed block of the current frame is stored in the current frame memory and, at the end of the current frame, the reconstructed frame is transferred over to the reference frame memory to form the reference frame for the next frame. Accordingly, from causal templates formed from previously reconstructed samples stored in the frame memories, in step 116, perceptual masking effects are modeled. Then, in step 118, the non-perceptibility of distortion value is modeled from the masking effects. Lastly, in step 120, the non-perceptibility of distortion value is used to calculate the quantization step size for the next block to be encoded. Advantageously, in this manner, the bit rate of the encoded bitstream may be reduced, and transmission bandwidth and/or storage capacity spared, when it is determined that distortion associated with the video and/or image is substantially non-perceivable by a human observer.

Figure 6:
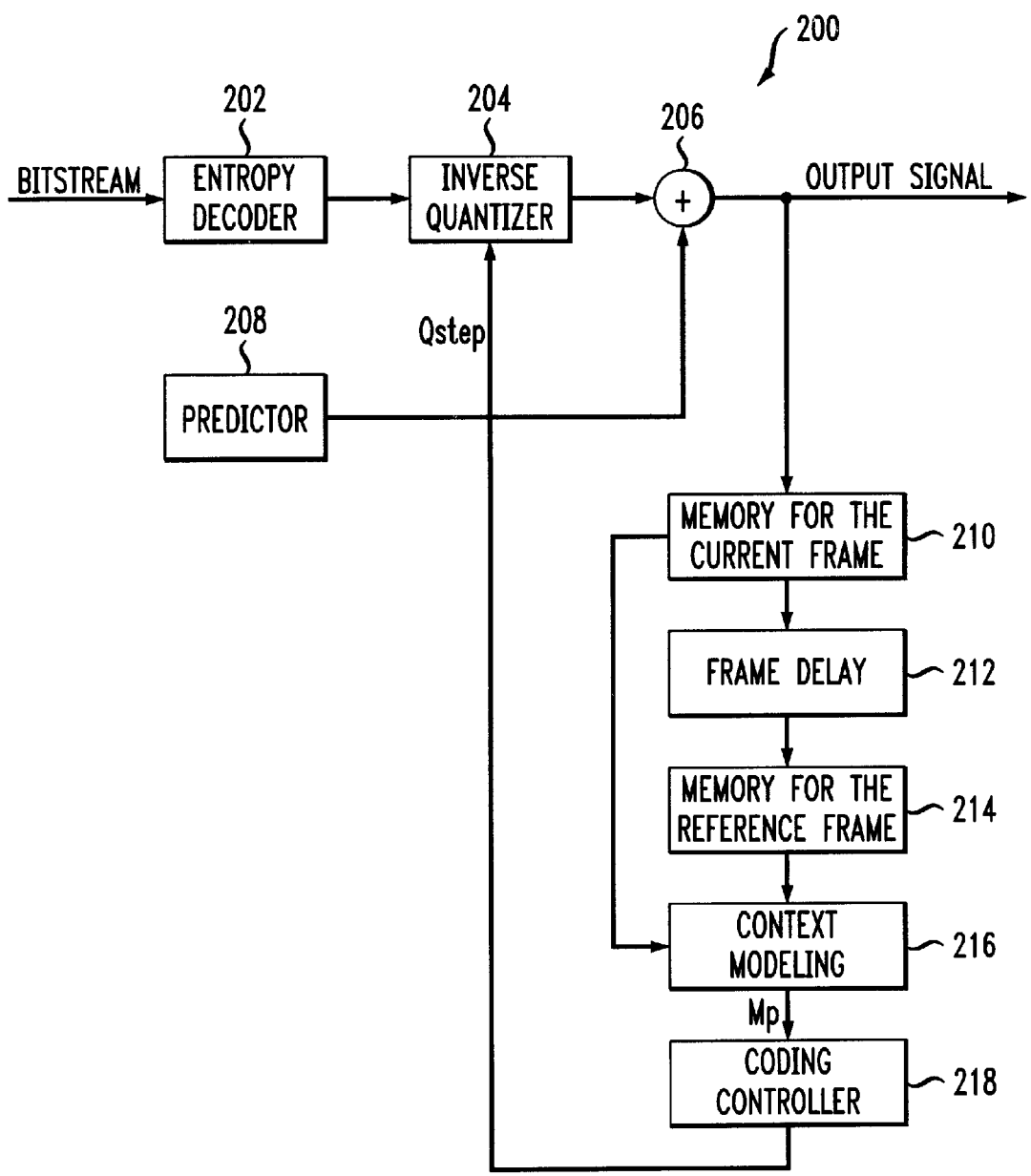
FIG. 6 is a block diagram of a context-based perceptual decoder according to an exemplary embodiment of the present invention.

Referring to FIG. 6, a block diagram of a context-based perceptual decoder according to an exemplary embodiment of the present invention is depicted. The decoder includes elements similar to those employed and described in conjunction with the encoder 10. The decoder 200 includes an entropy decoder 202, an inverse quantizer 204 coupled to the entropy decoder, and a signal adder 206 coupled to the inverse quantizer. The decoder 200 also includes a predictor 208 coupled to the signal adder 206. A current frame memory 210 is also included in the decoder 200 and is coupled to the signal adder. The decoder 200 also includes a reference frame memory 214 coupled to the current frame memory and separated from the current frame memory by one frame period, i.e., frame delay block 212. Further, the decoder 200 includes a context modeling unit 216 coupled to the current frame memory 210 and the reference frame memory 214. The decoder 200 also includes a coding controller 218 coupled to the context modeling unit and the inverse quantizer 204. Each of these elements have similar functions to the functions of the encoder elements with like names described above.

Accordingly, an encoded bit stream representing the encoded prediction error of the current block is received and entropy decoded by the entropy decoder 202. Then, the entropy decoded block is provided to the inverse quantizer 204. In inverse quantizer 204, quantization performed at the encoder is reversed. To do so, the inverse quantizer needs to have as an input the same quantization step size used at the encoder. Since, the quantization step size is generated at the encoder using only causal templates, the decoder 200 of the invention independently generates the same quantization step size by employing the same causal templates used at the encoder. This is advantageously accomplished in the same manner as at the encoder. That is, the context modeling unit 216 forms causal templates, for example as shown in FIGS. 3A and 3B, and FIGS. 4A and 4B, from previously reconstructed samples taken from the current frame memory 210 and the reference frame memory 214. The context modeling unit 216 calculates $M_p$ from the causal templates. $M_p$ is then used by the coding controller 218 to calculate the quantization step size $Q_{step}$. $Q_{step}$ is then applied to the inverse quantizer 204 to inverse quantize the current block. The inverse quantized current block is then added to a predictor signal, generated by the predictor 208 as is known, in signal adder 206 to form the decoded output signal. Also, the decoded block is stored in the current frame memory 210, i.e., similar to the reconstructed representation of the current block being stored in the current frame memory in the encoder, such that samples associated therewith may be used in forming a causal template for the next block to be decoded. Advantageously, as is evident from the above example, the decoder does not require quantization-related data from the encoder because of the inventive way that the quantization step size is generated, i.e., using only previously reconstructed samples. Therefore, transmission bandwidth and/or storage capacity between an encoder and decoder of the invention is saved.

It should be noted that the elements of the encoder 10 and decoder 200 may be respectively implemented using a central processing unit, microprocessor, application-specific integrated circuit or other data processing device in a computer, video transmitter, cable system headend, television set-top box or other type of video signal processor. The central processing unit, microprocessor, application-specific integrated circuit or other data processing device may also have memory associated therewith for storing data and results associated with each element's function when necessary. The invention may be utilized in conjunction with numerous types of video processing or transmission systems. Thus, while the invention is illustrated above using an exemplary video encoding system, it should be understood that the invention is not limited to use with any particular type of video signal format, video encoding standard or encoding system configuration. The invention is instead more generally applicable to any video encoding system in which it is desirable to adapt the quantization step size used for quantizing the signal as a function of non-perceptibility of distortion, while not requiring the transmission of quantization-related overhead information to a corresponding decoder. It should also be understood that the invention is applicable to any image encoding system in which, for example, the units 26 and 28 of FIG. 2 and the units 212 and 214 of FIG. 6 are not necessary.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of perceptually quantizing a block of at least one image, the method comprising the steps of:

generating a non-perceptibility of distortion value, the non-perceptibility of distortion value being calculated from one or more masking values respectively calculated from previously reconstructed samples derived from the at least one image; and generating a quantization step size value for use in quantizing the block of the at least one image, the quantization step size value being a function of the non-perceptibility of distortion value.

2. The method of claim 1, wherein the previously reconstructed samples form one or more previously reconstructed sample sets.

3. The method of claim 2, wherein the one or more previously reconstructed sample sets are in the form of one or more respective templates.

4. The method of claim 2, wherein the one or more masking values are respectively calculated by performing arithmetic operations on intensity values associated with previously reconstructed samples in the one or more sets.

5. The method of claim 1, wherein the one or more masking values are related to one or more masking effects including complexity masking, brightness masking, or movement masking.

6. The method of claim 5, wherein a complexity masking value is calculated by summing differences between intensity values associated with a set of previously reconstructed samples formed from a current frame.

7. The method of claim 5, wherein a brightness masking value is calculated by averaging intensity values associated with a set of previously reconstructed samples formed from a current frame.

8. The method of claim 5, wherein a movement masking value is calculated by summing respective differences between intensity values associated with respective sets of previously reconstructed samples formed from a current frame and a reference frame.

9. The method of claim 1, wherein the block is one of a pixel, a set of pixels, and a portion of a frame associated with the at least one image.

10. The method of claim 1, wherein the non-perceptibility of distortion value is calculated from a weighted summation of the one or more masking values.

11. The method of claim 1, wherein the quantization step size value is calculated by performing integer rounding on the non-perceptibility of distortion value.

12. A method of perceptually encoding at least one image, the method comprising the steps of:

generating a quantization step size value as a function of a non-perceptibility of distortion value, the non-perceptibility of distortion value being a function of one or more masking values respectively calculated from previously reconstructed samples associated with the at least one image;

quantizing a current block associated with the at least one image in accordance with the quantization step size value; and outputting the quantized current block.

13. The method of claim 12, wherein the quantized current block is output without quantization-related overhead information.

14. Apparatus for perceptually quantizing a block of at least one image, the apparatus comprising:

at least one processing device operative to generate: (i) a non-perceptibility of distortion value, the non-perceptibility of distortion value being calculated from one or more masking values respectively calculated from previously reconstructed samples derived from the at least one image, and (ii) a quantization step size value for use in quantizing the block of the at least one image, the quantization step size value being a finction of the non-perceptibility of distortion value; and memory coupled to the at least one processing device operative to store information related to one or more of the non-perceptibility of distortion value, the masking values, and the quantization step size value.

15. The apparatus of claim 14, wherein the previously reconstructed samples form one or more previously reconstructed sample sets.

16. The apparatus of claim 15, wherein the one or more previously reconstructed sample sets are in the form of one or more respective templates.

17. The apparatus of claim 15, wherein the one or more masking values are respectively calculated by performing arithmetic operations on intensity values associated with previously reconstructed samples in the one or more sets.

18. The apparatus of claim 14, wherein the one or more masking values are related to one or more masking effects including complexity masking, brightness masking, or movement masking.

19. The apparatus of claim 18, wherein a complexity masking value is calculated by summing differences between intensity values associated with a set of previously reconstructed samples formed from a current frame.

20. The apparatus of claim 18, wherein a brightness masking value is calculated by averaging intensity values associated with a set of previously reconstructed samples formed from a current frame.

21. The apparatus of claim 18, wherein a movement masking value is calculated by summing respective differences between intensity values associated with respective sets of previously reconstructed samples formed from a current frame and a reference frame.

22. The apparatus of claim 14, wherein the block is one of a pixel, a set of pixels, and a portion of a frame associated with the at least one image.

23. The apparatus of claim 14, wherein the non-perceptibility of distortion value is calculated from a weighted summation of the one or more masking values.

24. The apparatus of claim 14, wherein the quantization step size value is calculated by performing integer rounding on the non-perceptibility of distortion value.

25. Apparatus for perceptually quantizing a block of at least one image, the apparatus comprising:

a context modeler for generating a non-perceptibility of distortion value, the non-perceptibility of distortion value being calculated from one or more masking values respectively calculated from previously reconstructed samples associated with the at least one image; and a coding controller coupled to the context modeler for generating a quantization step size value for use in quantizing the block of the at least one image, the quantization step size value being a function of the non-perceptibility of distortion value.

26. A method of perceptually inverse quantizing a block of at least one image, the method comprising the steps of:

generating a non-perceptibility of distortion value, the non-perceptibility of distortion value being calculated from one or more masking values respectively calculated from previously reconstructed samples derived from the at least one image; and generating a quantization step size value for use in inverse quantizing the block of the at least one image, the quantization step size value being a function of the non-perceptibility of distortion value.

27. Apparatus for perceptually inverse quantizing a block of at least one image, the apparatus comprising:

at least one processing device operative to generate a non-perceptibility of distortion value, the non-perceptibility of distortion value being calculated from one or more masking values respectively calculated from previously reconstructed samples derived from the at least one image, and to generate a quantization step size value for use in inverse quantizing the block of the at least one image, the quantization step size value being a finction of the non-perceptibility of distortion value; and memory coupled to the at least one processing device operative to store information related to one or more of the non-perceptibility of distortion value, the masking values, and the quantization step size value.

* * * * *